United States Patent [19]

Matsuo et al.

[11] Patent Number: 4,954,846
[45] Date of Patent: Sep. 4, 1990

[54] DETECTING DEVICE FOR DETECTING THE SIZE AND/OR PRESENCE OF AN ORIGINAL DOCUMENT

[75] Inventors: Toshihisa Matsuo, Yamatokooriyama; Toshio Yamagishi, Nara, both of Japan

[73] Assignee: Sharp Kabushiki Kaisha, Osaka, Japan

[21] Appl. No.: 440,268

[22] Filed: Nov. 22, 1989

[30] Foreign Application Priority Data

Nov. 22, 1988 [JP] Japan .................................. 63-294966
Nov. 24, 1988 [JP] Japan .................................. 63-296752

[51] Int. Cl.$^5$ ............................................. G03G 21/00
[52] U.S. Cl. ..................................... 355/311; 355/75; 355/204
[58] Field of Search ................. 355/204, 230, 231, 311, 355/75, 243, 209; 250/560, 214 AL

[56] References Cited

U.S. PATENT DOCUMENTS

| | | | |
|---|---|---|---|
| 4,368,406 | 1/1983 | Kruzich et al. | 250/214 AL X |
| 4,514,727 | 4/1985 | Van Antwerp | 250/214 AL X |
| 4,562,650 | 2/1986 | Okuda | 34/149 |
| 4,658,129 | 4/1987 | Fan | 250/214 AL X |
| 4,713,550 | 12/1987 | Anzai et al. | 355/204 X |

FOREIGN PATENT DOCUMENTS 59-77430 5/1984 Japan .

Primary Examiner—Arthur T. Grimley
Assistant Examiner—Sandra L. Hoffman

[57] ABSTRACT

An original document detecting device includes at least a pair of elements made up of a light emitting element and a light receiving element oppositely arranged on both sides of an original placing platform which is used for placing an original document, for example, on a copying machine. When no original document is present on the platform, the light receiving element receives the light from the light emitting element. When an original document is placed on the platform, the light is interrupted because of the presence of the original document. The detecting apparatus is provided for detecting whether the light is received by the light receiving element or the light is interrupted by an original document. Because the light is interrupted, the presence or absence of the original document is detected. There is also provided a sensor for detecting the intensity of disturbance of light and drive control apparatus for controlling the intensity of the input value of the light emitting element, so as to control the intensity of the input light of the light receiving element dependent on the output signal of the sensor. The apparatus can also be used for determining the size of the original document when an original document is present on the placing platform.

9 Claims, 5 Drawing Sheets

DETECTING DEVICE FOR DETECTING THE SIZE AND/OR PRESENCE OF AN ORIGINAL DOCUMENT

BACKGROUND OF THE INVENTION

1. FIELD OF THE INVENTION

The present invention relates to an original document detecting device for detecting a size of an original document, and more particularly to an original size detecting device for automatically selecting any one of copying sheet sizes and selecting a suitable magnification and minification rate of copying operation in accordance with the size of the original document for use in a copying apparatus or the like. Also the device can detect the presence or absence of a document.

2. DESCRIPTION OF THE PRIOR ART

There is known a copying machine having an original size detecting device provided therein for detecting a size of an original document disposed on its original placing platform and automatically selecting a magnification and minification rate (referred to as MAG/MIN rate hereinafter) of a copying operation and a suitable copying paper size among various paper sizes, thereby preventing an operator from performing an erroneous copying operation. Various kinds of original size detecting devices have been proposed and among them is a well known a kind of detecting device that has a plurality of pairs of light emitting elements and light receiving elements.

Specifically, there are provided a plurality of pairs of light emitting elements and light receiving elements respectively on both sides of an original placing platform holding an original document thereon so as to constitute a plurality of detecting mechanisms, thereby detecting presence or absence of an original document. Such pairs of detecting mechanisms are respectively provided on the positions of the both sides of the original placing platform corresponding to the sizes of the original documents such as A4 and B5 for example, so that the light emitted from one or more emitting elements is interrupted by the original document and is not received by the corresponding light receiving elements, whereby the size of the original document is detected.

In such a conventional detecting device for detecting whether the original document is present or absent, the intensity of the output light emitted from the light emitting elements is fixed so as to be constant. That is say, in the case of using a light emitting diode as a light emitting element, the value of the voltage applied to the light emitting diode is fixed to be constant all the time.

The output signal of the light receiving element is amplified to a predetermined value by an amplifier means, and upon detecting the amplified output value of the light receiving element, a judgment is made whether or not an original document is placed on the original placing platform. In such a conventional detecting device, there is an influence due to disturbance light which effects a detection signal of a light receiving element and the output signal corresponding to the disturbance light received by the light receiving element is also amplified by the amplifier at the same time, therefore, the S/N ratio becomes small, resulting in occurrence of an erroneous detection of an original size. In particular, in case the intensity of the output light emitted by the light emitting element is fixed to be constant, the influence of the disturbance light may be larger than that of regular light emitted by the light emitting element, resulting in affecting detrimentally the light receiving element. Moreover, the output signal of the light receiving element is not stable due to changes of the light emitting and light receiving elements with the time lapse and changes of the environment such as temperature, moisture or the like, so that it becomes impossible to detect the size of the original document accurately.

Although it is considered that the S/N ratio of the output signals of the light receiving element is raised by raising the amplification rate of the amplifier, since not only the regular output signals of the regular light emitted from the light emitting elements but also the output signals due to other disturbance light are amplified by the amplifier at the same time, the effect for improving the S/N ratio can be little obtained. In particular, the more the disturbance light, the more the noise due to the disturbance light becomes even if the output signals of the light receiving elements are amplified, and therefore, the problems mentioned above can not be completely eliminated.

In this case, if the quantity of the light emitted from the light emitting elements is constant, the output value of the light receiving elements is constant so long as the characteristics of the light receiving elements are not changed. The output signal of the light receiving elements is not constant, however, due to the changes of the photo diodes with the time lapse, changes of the environment of the light emitting elements and light receiving elements or to an influence of disturbance light, so that the presence or absence of the original document is apt to be erroneously detected.

Therefore, when the output signal of the light receiving elements is amplified through an amplifier, the variation value of the output signal of the light receiving elements is revised by changing the amplification rate. However, according to a method of amplifying the output signal of the light receiving elements, since the noise component received by the light receiving element is also amplified, the S/N ratio is not completely improved. In case the amplification rate is set in the condition with high output of the light receiving elements, if the light receiving signal is reduced too small due to a change of the condition of the light receiving elements, the signal of a level necessary for detecting the original document can not be obtained.

SUMMARY OF THE INVENTION

An essential object of the present invention is to provide an original document detecting device for accurately detecting presence or absence of an original document, as well as detecting a size of an original document, and eliminating a bad influence of disturbance light on the detecting device.

Another object of the present invention is to provide an original document detecting device for accurately detecting presence or absence of an original document regardless of changes of condition of the detecting device such as changes of the characteristics of the device with the time lapse.

According to a feature of the present invention, an original document detecting device comprises a plurality of pairs of light emitting elements and light receiving elements oppositely arranged on both sides of an original placing platform on which an original document is placed, so that the light emitted from the light emitting element travels to the corresponding light receiving element along top surface of the original placing platform. When no original document is placed on the original placing platform, the light receiving element receives the light from the light emitting element. On the other hand, when an original document is placed on the platform, the light is interrupted by the original document. Detecting means are provided for detecting whether the light is received by the light receiving element or the light is interrupted by an original document, so that the presence or absence of the original document is detected in dependence on the output signals of the light receiving elements, wherein there is provided a sensor for detecting the intensity of disturbance light and drive control means for controlling the intensity of the input value of the light emitting elements so as to control the input light of the light receiving elements in response to the output signals of the sensor.

According to another feature of the present invention, an original document detecting device for detecting the presence or absence of an original document by detecting mechanisms composed of light emitting elements and light receiving elements, includes drive control means for controlling the output signal of the light emitting elements.

In the original document detecting device according to the present invention, the greater the disturbance light, the more the intensity of the light emitted by the light emitting elements is controlled to be increased in response to detection of the quantity of the disturbance light, so that the quantity of the regular light received by the light receiving elements is increased, thereby eliminating the influence of the disturbance light. Moreover, when the disturbance light is small, the quantity of the light emitted by the light emitting elements is decreased. However, since the influence of the disturbance light is small, the size of the original document can be accurately detected.

According to an original document detecting device of the present invention, if the output signal of the light receiving elements is too small, the output value of the light emitting elements is raised in order to revise the small output signal of the light receiving elements. Moreover, if the output signal of the light receiving elements is too large, the output signal of the light emitting elements is lowered in order to revise the large output signal. By constituting as described above, the output signal of the light receiving elements can be maintained to be constant by receiving the constant output light signal of the light emitting elements, whereby the original document can be accurately detected regardless of changes of the condition of the detecting device such as a change of the characteristics of the detecting components with the time lapse, solving the deterioration of the signal-to-noise ratio (referred to as S/N hereinafter).

The features of the present invention which are believed to be novel are set forth with particularity in the appended claims. The present invention together with further objects and advantages thereof may best be understood with reference to the following detailed description, taken in conjunction with the accompanying drawings.

DETAILED DESCRIPTION OF THE PREFERRED EMBODIMENT

Before the description proceeds, it is noted that the present invention is explained with reference to an example of an original document detecting device for detecting four kinds of original document sizes of B5, A4, B4 and A3 in order to select a copying paper size automatically in a copying machine.

The structure of light emitting elements and light receiving elements used in an original document detecting device provided in a copying machine is explained hereinafter with reference to FIGS. 2 and 3.

Figure 3:
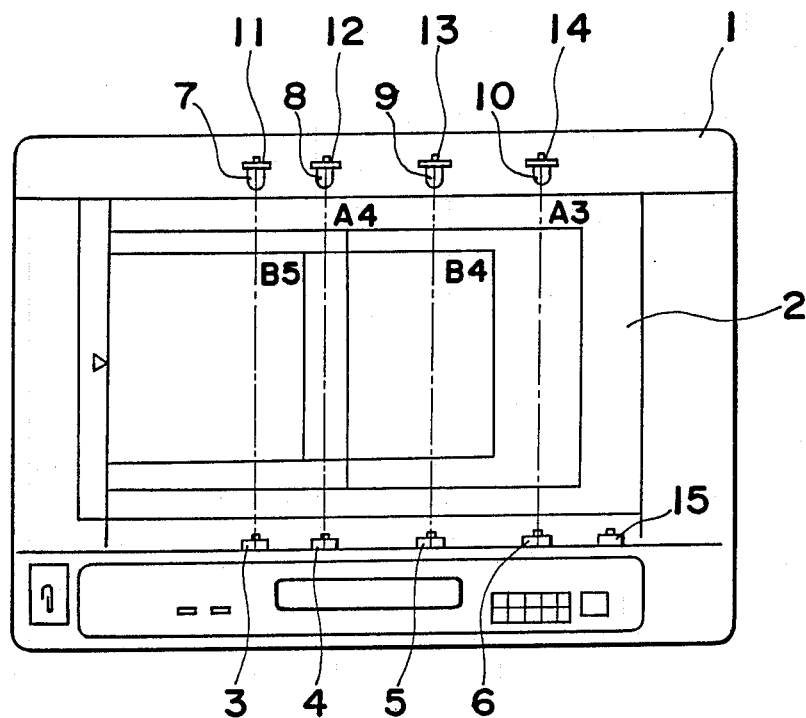
FIG. 3 is a top plan view of FIG. 2.

As shown in FIG. 3, an original placing platform 2 of a generally rectangular shape is formed of transparent and flat table glass plate, which is provided on the top portion of a copying machine 1. The table glass of the original placing platform 2 has its peripheral edges framed by a front frame portion, a rear frame portion and both side frame portions. An operation panel of the copying machine is disposed adjacent to the front frame portion of the platform 2. When the original document is placed on the original placing platform 2, one edge of the original document is aligned with the inner edge of one side frame portion as the standard for placing.

Four light receiving elements 3 to 6 which are photo diode are disposed in the front frame portion and four light emitting elements 7 to 10 which are infrared emitting diode are disposed in the rear frame portion of the original placing platform 2 arranged in a manner of opposing each other, thereby forming four detecting mechanisms 11 to 14. The light emitting elements 7 to 10 and the light receiving elements 3 to 6 are so disposed that each light beam emitted from each light emitting element travels in a direction parallel to the inner edge of the side frame set as the standard for placing the original document. That is, the light axis of the first detecting mechanism 11 composed of a pair of the light emitting element 7 and light receiving element 3 is interrupted by any size of an original document 24 greater than B5 size, the light axis of the second detecting mechanism 12 composed of a pair of the light emitting element 8 and light receiving element 4 is interrupted by any size greater than A4 size, the light axis of the third detecting mechanism 13 composed of a pair of the light emitting element 9 and light receiving element 5 is interrupted by any size greater than B4 size, and the light axis of the fourth detecting mechanism 14 composed of a pair of the light emitting element 10 and light receiving element 6 is interrupted by only the original document 24 of A3 size, so that the presence or absence of the original document 24 is detected, whereby the size of the original document 24 can be judged in accordance with the output signals of the respective detecting mechanisms 11 to 14. The size of the original document 24 can be judged in accordance with the output conditions of the light receiving photo diodes 3 to 6 as shown in the table for example.

TABLE 1

| LIGHT RECEIVING | ORIGINAL SIZE | | | |
|---|---|---|---|---|
| ELEMENT NO. | B5 | A4 | B4 | A3 |
| PHOTO DIODE 3 | OFF | OFF | OFF | OFF |
| PHOTO DIODE 4 | ON | OFF | OFF | OFF |
| PHOTO DIODE 5 | ON | ON | OFF | OFF |
| PHOTO DIODE 6 | ON | ON | ON | OFF |

ON: condition of receiving the light
OFF: condition of interrupting the light

In the detecting device according to the present invention, there is disposed a sensor 15 for detecting the intensity of disturbance light in the front frame portion of the original placing platform 2 aligned in a manner similar to the location of the light receiving elements 3 to 6. The sensor 15 is made of a photo diode for example similarly to the light receiving elements, which is located in a position where the disturbance light is not interrupted by any size of original document when the sensor 15 receives the disturbance light. Although it is preferable that the sensor 15 is so located as to receive the disturbance light in a manner similar to the light receiving elements 3 to 6, the sensor 15 may be located in a suitable portion on the copying machine so long as the intensity of the disturbance light can be detected. In other words, the higher the illuminance in the position for setting the copying machine, the more influence due to the disturbance light is affected, and therefore, the object of the present invention can be attained by detecting the quantity of the disturbance light in the position where the copying machine is placed.

The output signal of the sensor 15 receiving the disturbance light, which represents the measurement value of the disturbance light, is supplied to a control unit for driving the respective light emitting diodes 7 to 10 of the detecting mechanisms 11 to 14. The control unit controls the intensity of the current flowing to the light emitting diodes 7 to 10 for controlling the light emitting quantity of the light emitting diodes 7 to 10 dependent on the output signal of the sensor 15.

Figure 1:
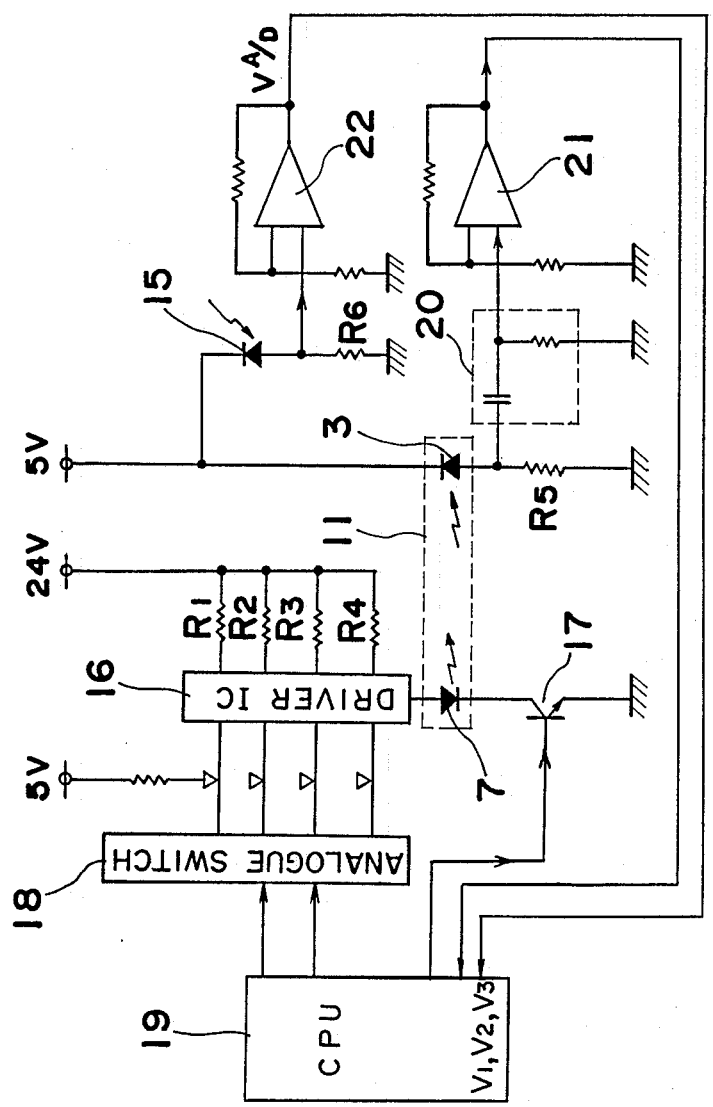
FIG. 1 is a circuit diagram showing an embodiment of an original document detecting device according to the present invention.

The above mentioned control operation is explained with reference to FIG. 1, wherein only a detecting mechanism 11 composed of a pair made up of light emitting and light receiving elements 7 and 3 is shown for brevity but similar circuit arrangements are respectively furthermore provided in correspondence to the detecting mechanisms 12, 13 and 14.

The light emitting diode 7 has its anode terminal connected to a power source of +24 volts through a driver integrated circuit (referred to as driver IC) 16 and through resistors R1, R2, R3 and R4, and also has its cathode terminal connected to the earth through a switching transistor 17. The driver IC 16 is operated in association with an analogue switch 18 so as to select and connect any one of the resistors R1 to R4 to the anode terminal of the light emitting diode 7. The analogue switch 18 decodes digital signals sent from a microcomputer 19 of a central processing unit (referred to as CPU hereinafter) for controlling the operation of the copying machine and selects suitable one of the resistors R1 to R4 so as to connect the selected one resistor to the anode terminal of the light emitting diode 7 through the driver IC 16.

The microcomputer 19 transmits a drive signal to the base terminal of the switching transistor 17 for emitting the light from the light emitting diode 7 at a suitable timing. The output signal of the photo diode 3 opposite to the light emitting diode 7 is fed to the microcomputer 19 so that the presence or absence of the original document is detected. That is to say, as listed in the table 1, the presence or absence of the original document is detected and the size of the original document is detected on the basis of the output conditions of the respective detecting mechanisms 11 to 14.

The light receiving element 3 of photo diode has its anode terminal connected to the earth through an output resistor R5 and has its cathode terminal connected to a power source of +5 volts. The voltage between the anode terminal of the photo diode 3 and the earth is fed to an amplifier 21 through a differentiating circuit 20 and the output signal of the amplifier 21 is fed to the microcomputer 19. That is to say, when the light emitting diode 7 is activated and the light beam emitted from the light emitting diode 7 is received by the photo diode 3, the quantity of the current flowing through the resistor R5 is increased and the voltage between the anode terminal of the light receiving diode 3 and the earth is raised, so that the raised voltage signal is fed to the microcomputer 19 through the amplifier 21 as an ON signal for discriminating the absence of the original document. Hereby, it is judged that the light beam emitted from the light emitting diode 7 is not interrupted by an original document, thereby detecting the absence of an original document. On the contrary, in the case of presence of an original document, the operation is performed in such a manner that, since the light beam emitted from the light emitting diode 7 is interrupted by the original document, the current flowing through the resistor R5 is not changed and the voltage between the anode terminal of the photo diode 3 and the earth is not raised and the low voltage signal is fed to the microcomputer 19 as an OFF signal through the amplifier 21, whereby the presence of the original document is detected.

On the other hand, the sensor 15 made of such as photo diode for detecting the disturbance light has its anode terminal connected to the earth through an output resistor R6 and has its cathode terminal connected to a power source of +5 volts. The voltage between the anode terminal of the photo sensor 15 and the earth is fed to the microcomputer 19 as a signal $V_{A/D}$ through an amplifier 22. Subsequently, the microcomputer 19 sends a control signal to the analogue switch 18 in response to receiving the output voltage $V_{A/D}$ from the amplifier 22 for controlling the quantity of the current flowing through the light emitting diode 7. At this time, in the microcomputer 19, the supplied voltage signal $V_{A/D}$ is compared with respective reference voltages V1, V2 and V3 ($V1 < V2 < V3$) and a selection signal is sent from the microcomputer 19 to the analogue switch 18 for selecting a suitable resistor among the resistors R1 to R4 ($R1 > R2 > R3 > R4$).

Figure 4:
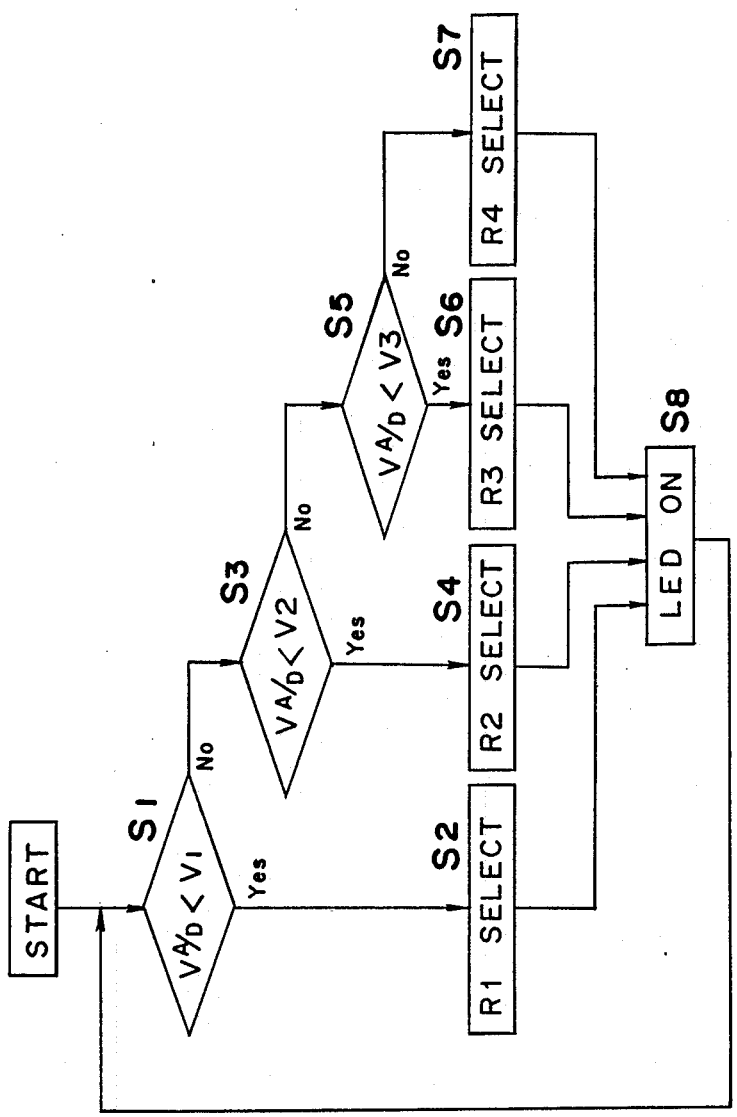
FIG. 4 is a flow chart showing a control operation of the emitting light in FIG. 1.

FIG. 4 shows a control flow performed by the microcomputer 19 for controlling the quantity of the current flowing through the light emitting diode 7 in dependence on the quantity of the disturbance light. As shown in FIG. 4, in order to discriminate the presence or absence of an original document placed on the original placing platform 2, the quantity of the disturbance light is measured. That is, the light intensity of the disturbance light is detected by the photo sensor 15 so as to be fed to the amplifier 22 and the amplified output voltage signal $V_{A/D}$ of the amplifier 22 is fed to the microcomputer 19. Subsequently, when receiving the voltage signal $V_{A/D}$ in the microcomputer 19, the voltage signal $V_{A/D}$ is compared with the first reference voltage V1 in step S1, and in case the voltage signal $V_{A/D}$ is smaller than the first reference voltage V1, i.e., in case the disturbance light is little, a selection signal for selecting the first resistor R1 is sent from the microcomputer 19 to the analogue switch 18 in step S2. If the voltage signal $V_{A/D}$ is larger than the first reference voltage V1, i.e., in case the disturbance light is large, the voltage signal $V_{A/D}$ is compared with the second reference voltage V2 in step S3. And if the voltage signal $V_{A/D}$ is smaller than the second reference voltage V2, a selection signal for selecting the second resistor R2 is sent to the analogue switch 18 in step S4. If the voltage signal $V_{A/D}$ is larger than the second reference voltage V2, the voltage signal $V_{A/D}$ is compared with the third reference voltage V3 in step S5. If the result of the comparison is $V_{A/D} < V3$, the third resistor R3 is selected in step S6, and if the result of the comparison is $V_{A/D} > V3$, the fourth resistor R4 is selected in step S7.

Since the values of the resistances of the resistors R1 to R4 are in a relation of $R1 > R2 > R3 > R4$, the quantity of the light to be emitted by the light emitting diode 7 is controlled in dependence on the quantity of the disturbance light. That is to say, the more the disturbance light is, the smaller the value of the resistance of the resistor is selected among the resistors R1 to R4 in order to increase the quantity of the light to be emitted by the light emitting diode 7. On the other hand, the less the disturbance light is, the larger the value of the resistance of the resistor is selected among the resistors R1 to R4 in order to decrease the quantity of the light to be emitted.

As described above, when one of the resistors is selected among the resistors R1 to R4, a selection signal for selecting said one resistor is generated from the microcomputer 19 and fed to the analogue switch 18, whereby the selected one resistor is connected to the anode terminal of the light emitting diode 7 through the driver IC 16. Subsequently, a timing signal for emitting the light emitting diode 7 is generated from the microcomputer 19 and fed to the transistor 17. In other words, the timing signal is sent from the microcomputer 19 to the transistor 17 to switch the transistor 17 on in dependence on the instruction for detecting the size of the original document in association with a series of the incorporated operation. Accordingly, the quantity of the current flowing through the light emitting diode 7 is controlled in dependence on the value of the resistance of the selected resistor so that the quantity of the light emitted by the light emitting diode 7 is appropriately controlled.

Figure 2:
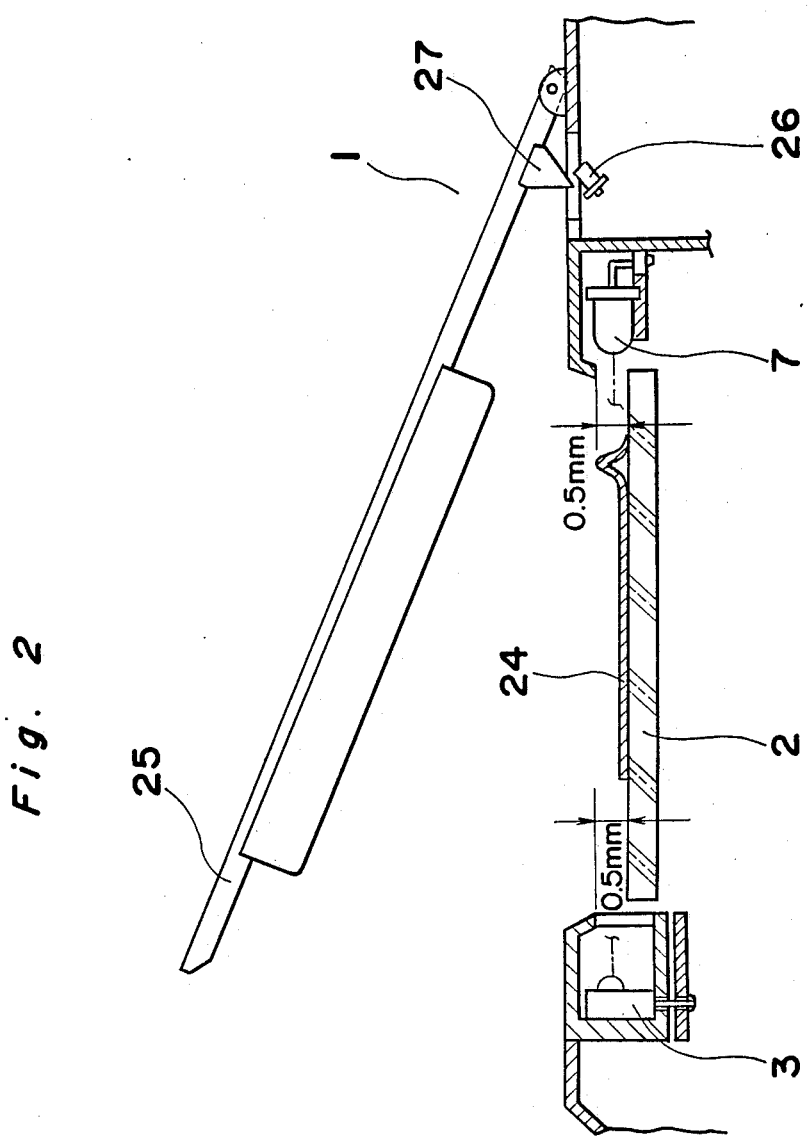
FIG. 2 is a cross sectional view showing an arrangement constitution of light emitting elements and light receiving elements applied to an original size detecting device employed in a copying machine according to the present invention.

The timing of the emission of the light emitting diode 7 (i.e., the timing of detecting the original document) is set to perform the detecting operation in a period during the closing operation of the original document cover 25 onto the original document 24 shown in FIG. 2, i.e., just before starting the copying operation. For example, the light emitting diode 7 is appropriately emitted during the period of closing the original document cover 25 to a releasing inclination angle of 30° after the original document is placed on the original placing platform 2. For this purpose, there is provided a starting switch 26 below the top surface near the hinge portion of the original document cover 25 for starting the detection of the original document and there is further provided an acting member 27 on the top surface near the hinge portion of the original document cover 25. Therefore, when the original document cover 25 is inclined to an angle of generally 30°, the starting switch 26 is turned on and the output signal of the starting switch 26 is sent to the microcomputer 19, so that the microcomputer 19 sends a drive signal to the transistor 17 for emitting the light emitting diode 7 in response to receiving the output signal of the starting switch 26.

In this embodiment, although the original document is detected by disposing the light emitting elements and light receiving elements whose light axes are interrupted by the original document, it is not limited to this arrangement and also a plurality of pairs of the light emitting elements and light receiving elements may be so disposed that the light receiving elements receive the light reflected by the original document.

According to the present invention, since the quantity of the light to be emitted by the light emitting elements is so controlled as to eliminate the influence of the disturbance light in the position where the copying machine is placed, the presence or absence of the original document can be detected more accurately.

Figure 5:
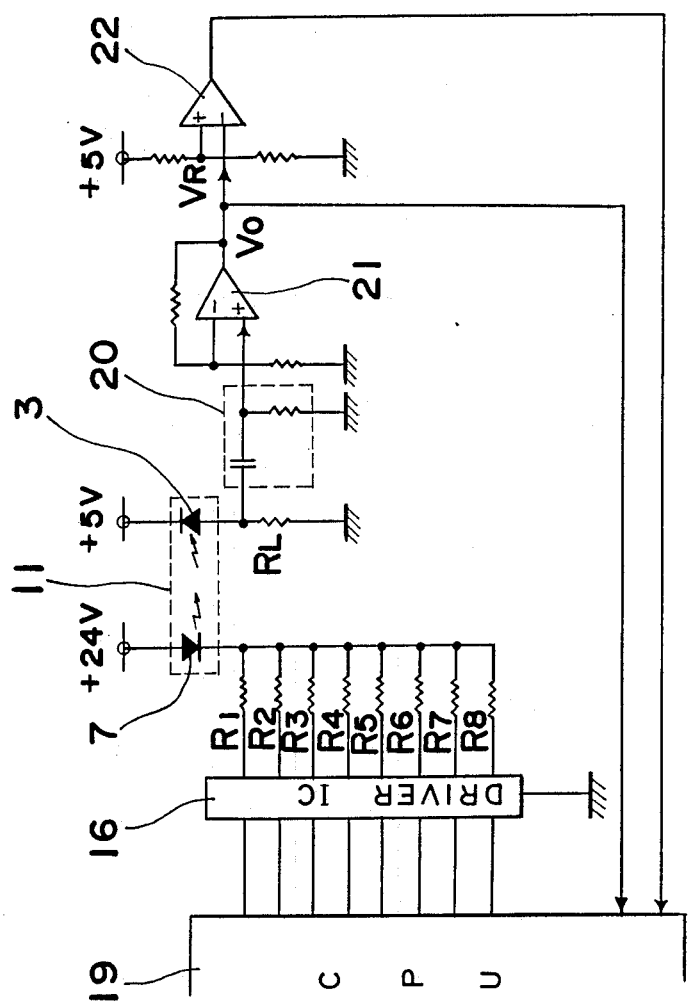
FIG. 5 is a circuit diagram showing another example of an original document detecting device according to the present invention.

A modified example of the present invention is shown in FIG. 5, wherein the circuit arrangement has a construction similar to that of the first embodiment except having a sensor means and the same reference numerals are used for the like parts.

In the modified example of the present invention, the quantity of the light of the light emitting elements 7 to 10 is controlled in order to revise the change of the output signals of the light receiving elements 3 to 6 caused by changes of the characteristics of the detecting mechanism with the time lapse and by a change of the condition in which the copying machine is set.

The light receiving photo diode 3 has its anode terminal connected to the earth through the output resistor $R_L$ and has its cathode terminal connected to the power source of $+5$ volts. The output voltage of the anode terminal of the light receiving diode 3 is applied to the operational amplifier 21 through the differentiating circuit 20 formed of a CR circuit so as to be appropriately amplified. The output voltage Vo of the amplifier 21 is applied to the minus terminal of the comparator 22 for judging the presence or absence of an original document. A reference voltage $V_R$ is applied to the plus terminal of the comparator 22, which is compared with the voltage signal Vo. When the output voltage Vo from the amplifier 21 is below the reference voltage $V_R$, the level of the output signal of the comparator 22 is high ("H"). This means that, the light beam projected from the light emitting diode 7 to the light receiving diode 3 is interrupted by the original document and the light receiving diode 3 is turned off, thereby detecting the presence of the original document 24.

The output signal of the comparator 22 is fed to the microcomputer 19 which discriminates the output signal of the comparator 22 so as to detect the presence or absence of the original document if necessary. The microcomputer 19 transmits a drive signal to the driver IC 16 in response to the output signal Vo fed from the amplifier 21 for controlling the intensity of the light of the light emitting diode 7.

The microcomputer 19 selects suitable one of resistors R1 to R8 ($R1 > R2 > \ldots > R8$) in response to the output signal Vo from the amplifier 21 and the driver IC 16 connects the one resistor selected among the resistors R1 to R8 by the microcomputer 19 with the light emitting diode 7 in series, thereby controlling the intensity of the emitting light of the light emitting diode 7. That is to say, in case the output of the light receiving diode 3 is small, the output Vo of the amplifier 21 is small, and therefore, the microcomputer 19 compares the small output voltage Vo with the reference voltage and selects smaller one resistor among the resistors R1 to R8 in order to increase the intensity of the emitting light of the light emitting diode 7. The quantity of the emitting light of the light emitting diode 7 is determined in dependence on the quantity of the current flowing through the light emitting diode 7, wherein the quantity of the current is determined in dependence on the resistance of the resistor serially connected to the light emitting diode 7.

Referring to the control operation more in detail, the output light signal of the light emitting diode 7 is applied to the light receiving diode 3 and the output voltage signal of the light receiving diode 3 is fed to the amplifier 21 through the differentiating circuit 20 so as to be amplified. The amplified output voltage Vo of the amplifier 21 is fed to the microcomputer 19 and the microcomputer 19 selects one of the resistors R1 to R8 in such a manner that the output voltage Vo is equal to the predetermined reference voltage (V). At this time, the microcomputer 19 compares the output voltage Vo with the reference voltage V and selects one of the resistors R1 to R8 suitable for the output voltage Vo to be equal to the reference voltage V. The light emitting diode 7 is reexcited by the current flowing through the selected resistor so that the output voltage of the light receiving diode 3 is controlled to be a predetermined value.

As described above, in order to detect the presence or absence of the original document, the quantity of the emitting light of the light emitting diode 7 is so controlled that the output value of the light receiving diode 3 is to be constant. Therefore, since the predetermined output signal of the light receiving diode can be obtained all the time, the original document can be stably detected regardless of the changes of the photo diodes with the time lapse and of the changes of the condition in which the copying machine is set.

In addition, since the quantity of the emitting light of the light emitting diode is controlled to obtain a constant output of the light receiving diode, the amplification of the noise component can be more reduced so as to raise the S/N ratio, thereby detecting the original document more stably.

What is claimed is:

1. An original document detecting device for detecting whether an original document is present or absent, comprising:
   at least one pair of elements that includes a light emitting element and a light receiving element oppositely disposed to each other on both sides of an original placing platform which is used for placing an original document thereon,
   detecting means for detecting whether the light beam emitted from said light emitting element is received by said light receiving element or interrupted by an original document, thereby detecting the presence or absence of the original document in dependence on the output value of said light receiving element,
   sensor means for detecting a quantity of disturbance light around the detecting device,
   control means for controlling the quantity of the light beam to be emitted from said light emitting element dependent on the output value of said sensor means.

2. The original document detecting device according to claim 1, wherein a plurality of pairs of the light emitting element and light receiving element are disposed on both sides of the original placing platform.

3. The original document detecting device according to claim 1, wherein said light emitting element is an infrared emitting diode and said light receiving element is a photo diode.

4. The original document detecting device according to claim 1, wherein said sensor means is made of light receiving photo diode.

5. The original document detecting device according to claim 1, wherein said sensor means has an anode terminal connected to ground through an output resistor and has a cathode terminal connected to a power source of +5 volts.

6. An original document detecting device for detecting whether an original document is present or absent, comprising:
   at least one pair of elements that includes a light emitting element and a light receiving element oppositely disposed to each other on both sides of an original placing platform which is used for placing an original document thereon,
   detecting means for detecting whether the light beam emitted from said light emitting element is received by said light receiving element or interrupted by an original document, thereby detecting the presence or absence of the original document in dependence on the output value of said light receiving element,
   control means for controlling the quantity of the light beam to be emitted from said light emitting element so that the output value of said light receiving element is set to be a predetermined value.

7. The original document detecting device according to claim 6, wherein there are a plurality of pairs of elements, each pair including a light emitting element and a light receiving element disposed on both sides of the original placing platform.

8. The original document detecting device according to claim 6, wherein said light emitting element is an infrared emitting diode and said light receiving element is a photo diode.

9. The original document detecting device according to claim 8, wherein said light receiving diode has an anode terminal connected to ground through a resistor and has a cathode terminal connected to a power source of +5 volts.

* * * * *